United States Patent [19]

Schröder

[11] Patent Number: 4,756,601
[45] Date of Patent: Jul. 12, 1988

[54] THREE-DIMENSIONAL IMAGE-VIEWING APPARATUS

[75] Inventor: Wolfgang Schröder, Wöllstein, Fed. Rep. of Germany

[73] Assignee: Jos. Schneider Optische Werke Kreuznach GmbH & Co. KG, Bad Kreuznach, Fed. Rep. of Germany

[21] Appl. No.: 798,602

[22] Filed: Nov. 15, 1985

[30] Foreign Application Priority Data

Nov. 15, 1984 [DE] Fed. Rep. of Germany ....... 3441745

[51] Int. Cl.$^4$ ...................... G02B 27/22; H04N 13/00
[52] U.S. Cl. .................................... 350/130; 350/138; 358/88
[58] Field of Search ............... 350/130, 131, 133, 137, 350/138, 501, 503, 576, 466, 467, 470, 471; 358/3, 88, 91

[56] References Cited

U.S. PATENT DOCUMENTS

| 2,891,444 | 5/1959 | Ewald | 350/576 X |
| 2,968,221 | 1/1961 | Zollner | 350/471 |
| 3,572,893 | 3/1971 | Bennett et al. | 350/130 |

FOREIGN PATENT DOCUMENTS

| 2721468 | 12/1977 | Fed. Rep. of Germany. |
| 2737038 | 2/1978 | Fed. Rep. of Germany. |
| 2830115 | 1/1979 | Fed. Rep. of Germany. |
| 3146490 | 6/1983 | Fed. Rep. of Germany. |
| 3214021 | 10/1983 | Fed. Rep. of Germany. |
| 3313217 | 10/1984 | Fed. Rep. of Germany. |

OTHER PUBLICATIONS

Walker, Bruce H., "On Stereoscopic Viewers", *Optical Spectra*, Dec., 1970, p. 34.
Prismenbrillen Für Stereobilder, Seite 34/ Mittwoch, Oct. 19, 1983, Nr. 243.

Primary Examiner—John K. Corbin
Assistant Examiner—Ronald M. Kachmarik
Attorney, Agent, or Firm—Karl F. Ross; Herbert Dubno

[57] ABSTRACT

The described three-dimensional image viewing apparatus offers the possibility to perceive spatial objects which are reproduced through a pair of stereoscopic images as three-dimensional images, without the necessity to provide auxiliary optical means in the vicinity of the eye during viewing. For this purpose, an optical image forming system according to the basic principle of a microscope is provided between the two images (1a, 1b) of the pair of stereoscopic images and the two exit pupils (11a, 11b) for the eyes of the viewer, consisting of two fields lenses (2a, 2b) located immediately in front of the light-emitting images, two objectives (5a, 5b) a positive optical system on the eye side (9, 10) and of mirrors (3a, 3b, 4a, 4b, 8) for folding the ray paths located between the images (1a, 1b) and the positive optical system (9, 10). With such a viewing apparatus, unusually large exit pupils (11a, 11b) can be achieved, so that the viewer can move around considerably, without loosing contact with the image. Through multiple folding of the ray paths a compact construction of the device is facilitated.

12 Claims, 7 Drawing Sheets

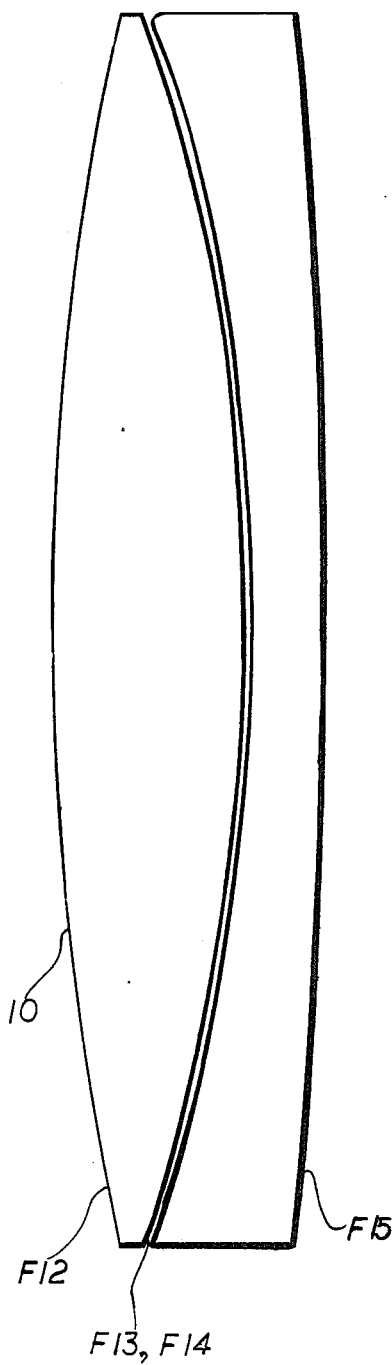

THREE-DIMENSIONAL IMAGE-VIEWING APPARATUS

FIELD OF THE INVENTION

The invention relates to a three-dimensional image-viewing apparatus wherein the image of an object is formed from two images in different lines of vision centrally projected.

BACKGROUND OF THE INVENTION

Three-dimensional viewing apparatuses have been known heretofore mainly for viewing stereoscopic photographs and for projection of stereoscopic images. In the case of devices for viewing of stereoscopic photographs, both images of the pair of stereoscopic images are formed with lenses or mirrors positioned close to the eye. Two different methods are known. In the case of the anaglyphic method, two separate ranges of wavelengths with corresponding chromatic filters in front of the eyes are used. In the case of the Nimslo method, two partial images are nested into one another and are viewed through a pressed-on screen of cylindrical lenses.

For conferences, lectures and movie presentations it is possible to project three-dimensional images. This is done either with special stereo-diaprojectors or stereo overhead projectors as well as with a combination of two flat-picture diaprojectors. The separation of the image is achieved through polarization filters in front of the projector objectives and through polarization spectacles which are worn by the viewer. The mentioned anaglyphic method is also used for stereo projection.

Further, a three-dimensional image viewing apparatus has become known in which an elastic concave mirror is oscillated in such manner that its spherical radius is periodically subject to small changes. Images which are projected in proper phase relation onto the concave mirror, reproducing different sections of a spatial object, can be fused into a single stereoscopic image by the viewer. This apparatus has been suitable only for a depth of about 30 cm of the object to be spatially reproduced.

Considerable efforts have been made in addition to create stereoscopic television. Thus far, however, no apparatus has been developed which can work without optical auxiliary means close to the eye.

OBJECT OF THE INVENTION

It is the object of the invention to create a three-dimensional image viewing apparatus for a spatial perception of objects projected through a pair of stereoscopic pictures, whereby no optical auxiliary means close to the eye are required.

SUMMARY OF THE INVENTION

According to the invention the object is achieved with a system which, between the two images and two exit pupils for the eyes of a viewer an optical image reproduction system following the basic principle of a microscope is arranged, the system consisting of two field lenses located immediately ahead of the luminous objects, two objectives, a positive optical system located close to the dye, and mirrors for folding the ray paths located between the images and the positive optical system in eye vicinity. According to the basic principle of a microscope, the pair of stereoscopic images formed from an object located at a finite distance is perceived as a real intermediate image which is projected to the infinite by means of an ocular so that a viewer can observe the intermediate image without accommodation. The three-dimensional image viewing apparatus according to the invention differs from a microscope essentially in that the object or objects, are not considerably maginified in the first partial image formation into the real intermediate image, but possibly even diminished and that for both eyes together only one positive optical system corresponding to one eyepiece is used.

The three-dimensional image viewing apparatus according to the invention offers the viewer who looks at the last optically effective surface of the apparatus the possibility to perceive three-dimensionally a spatial object projected through a pair of stereoscopic images. The spatial depth of the perception, which can be multi-colored and in motion, depends only on the depth of focus of the two images of the stereoscopic image pair.

The three-dimensional image viewing apparatus has many advantages. For instance, the three-diemnsional image viewing apparatus according to the invention allows a relatively large viewing distance and unusually large exit pupils, so that the viewer can vary the position of his eyes and his distance from the apparatus to a relatively high degree without losing contact with the image. The large visual field angle, especially in horizontal position, as well as the possibility to watch without accommodation, have to be considered as a further advantage. With the three-dimensional image viewing apparatus also an excellent image quality is achieved, which is limited only by the quality of the primary images of the pair of stereoscopic images, if the optical systems are constructed with care. The stereoscopic viewing apparatus according to the invention can also be used for stereo color television image pairs and for still or time-variable computer-monitored image pairs. Thereby, the reduced energy requirements are especially advantageous for television tubes or for computer-monitored screens for graphic images, this advantage resulting from the fact that the light is directly aimed at the eyes.

The two exit pupils of the optical image forming system at the location of the viewers eye can be positioned relatively far behind the positive optical system and their horizontal distance and their diameters can correspond approximately to the distance between the eyes of a viewer. The images can have a normal lateral orientation, meaning that they are not laterally reversed.

Advantageously, the two images are produced with television reception tubes or with computer-controlled graphic picture screens.

The two images can be diapositives which are traversable by rays.

The folding mirrors can be plane mirrors and the objectives multi-lens systems of the double-Gauss type.

The mounting edges of the objectives can serve as aperture diaphragms.

The real intermediate images present in the intermediate image plane between the objectives and the positive optical system on the eye side can be reproduced in the eyes of the viewer by the positive optical system on the eyeside in a manner that eliminates accommodation.

The horizontal diameter of the positive optical system on the eyeside can be larger than its vertical diameter.

The first component of the positive optical system on the eyeside can be a spherical concave mirror or an aspherical concave mirror. The asperical concave mirror can be constructed as an extra-axial partial surface of a paraboloid.

The second component of the positive optical system on the eyeside can be a color-corrected lens group.

BRIEF DESCRIPTION OF THE DRAWING

Further features, details and advantages of the invention result from the following description of several preferred embodiments represented in the drawing, which shows.

DESCRIPTION

Figure 1:
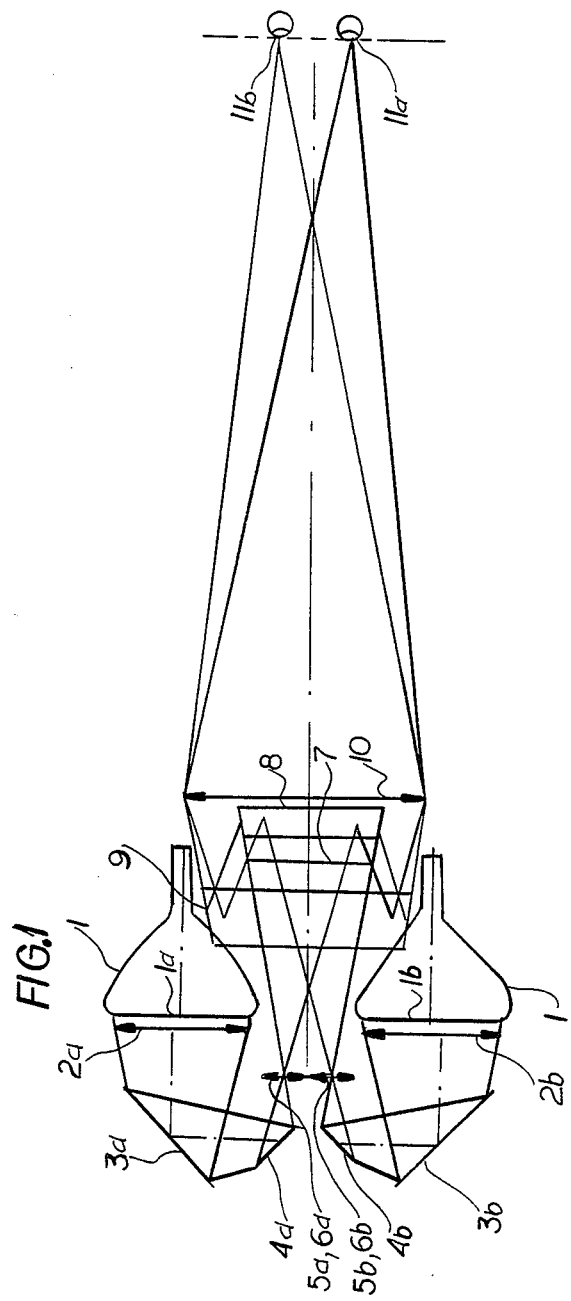
FIG. 1 a schematic horizontal section of a three-dimensional image viewing apparatus according to the invention with the two separate and partially overlapping ray paths for both eyes of the viewer at a scale of 1:5, FIG. 2 a schematic vertical section through the three-dimensional image viewing apparatus with vertical projection on the plane of the section of the beam-defining rays running outside the section plane, FIG. 3 a schematic horizontal section through a further embodiment of a three-dimensional image viewing apparatus according to the invention with different foldings of the ray paths at a scale of 1:5, FIG. 4 a schematic vertical section through the three-dimensional image viewing apparatus according to FIG. 3 with vertical projection on the plane of the section of the beam-defining rays running outside the section plane, FIG. 5 a horizontal section of the development of a three-dimensional image viewing apparatus according to the invention at a scale of 1:6, FIG. 6 a longitudinal section through a field lens and an objective assembly of a three-dimensional image viewing apparatus according to the invention with unfolded ray path at a scale of 0.5:1 and FIG. 7 a longitudinal section through the lens assembly on the eye side of the positive optical system of a three-diemnsional image viewing apparatus at a scale of 1:1.
Figure 2:
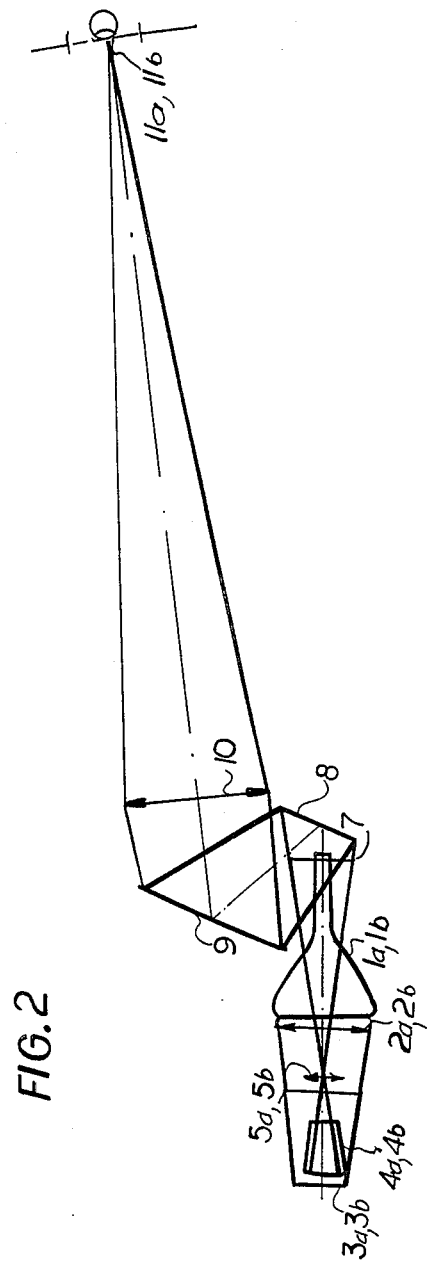

The three-dimensional image viewing apparatus represented in FIG. 1 and 2 is symmetrically constructed with respect to its vertical median plane. In order to obtain a pair of stereoscopic images, the represented apparatus has two television picture tubes 1 arranged parallel to each other and on whose picture screens the two partial images 1a, 1b of the pair of stereoscopic images are formed. The light emitted by each of the partial images 1a, 1b is focussed with the aid of field lenses 2a, 2b located in front of the picture screens and each is guided over two plane folding mirrors 3a, 4a, and 3b, 4b towards two image forming objectives 5a, 5b in such a manner that at a finite distance behind each of the image forming objectives 5a, 5b a real, upright and non-reversed intermediate image is created. The image forming objectives 5a, 5b are positioned immediately next to each other in a horizontal plane common to both television picture tubes. The image forming objectives 5a, 5b are provided with mounting edges 6a, 6b which function as aperture diaphragms.

From the two image forming objectives 5a, 5b situated in front of the two television picture tubes the light passing through an intermediate space between the television picture tubes 1 reaches the intermediate image plane 7 situated so far back from the picture screens as to allow sufficient space for the formation of the intermediate images. The two intermediate images of the stereoscopic image pair, generated in space in the intermediate image plane 7 are partially overlapping, and in the area of overlap, the two intermediate images do not necessarily have to show the same detail of the object in the same point.

The image forming rays of the intermediate images are directed by a plane mirror 8 towards a concave mirror 9 located above the television picture tubes 1 and from there via a lens assembly 10 towards the exit pupils 11a, 11b. The concave mirror 9 and the lens assembly 10 form together a positive optical system through which a viewer can view both intermediate images without accommodation. Based on the capacity of the human brain to coordinate the images perceived by both eyes, during the perception of the two intermediate images offset with respect to each other the impression of viewing a three-dimensional object is created. The coordination capacity of the human brain allows also the lateral displacement of the two intermediate images in horizontal direction towards each other or away from each other within certain limits, so that the relationship between height and width of the spatial perception can be established by the shooting conditions during the production of a pair of stereoscopic images. These shooting conditions can also be subject to temporary changes, whereby these changes can not be too big, in order not to overexert the adjustment capability of the viewer. As a result, the width of the picture that can be viewed through the three-dimensional image viewing apparatus depends on the shooting conditions and is changeable as desired, without changes in the described three-dimensional image viewing apparatus.

Figure 3:
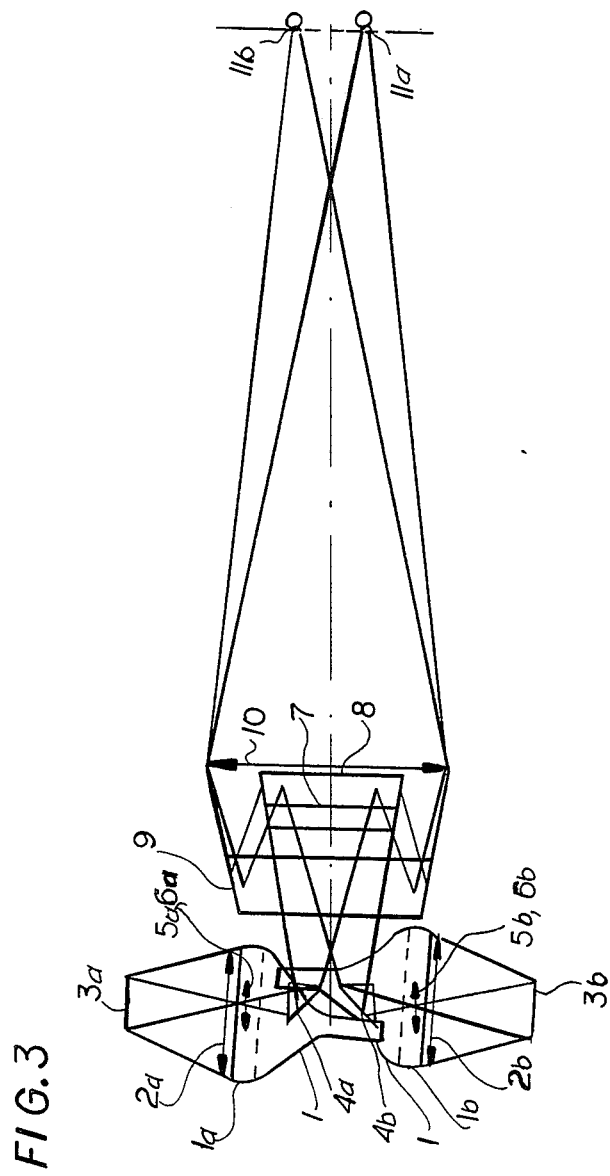
Figure 4:
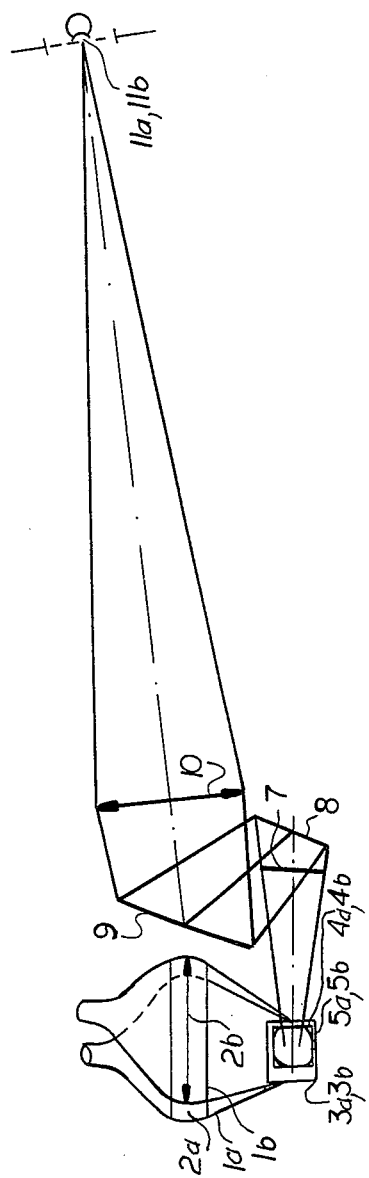

The three-dimensional image viewing apparatus described in FIG. 3 and 4 corresponds in its basic construction to the three-dimensional image viewing apparatus according to FIGS. 1 and 2. Therefore, the same numerals have been used to identify the individual elements. The three-dimensional image viewing apparatus according to FIGS. 3 and 4 is also characterized by reduced overall dimensions. This is achieved by an arrangement of the picture television tubes 1 so that their picture screens face away from each other. Thereby, the light emitted by the picture screens is directed by the folding mirrors 3a, 3b towards the image forming objectives 5a, 5b located underneath the picture television tubes 1 on a common axis and at a distance from each other and the light coming from the image forming objectives 5a, 5b is reflected by the folding mirrors 4a, 4b, positioned between the image forming obejectives 5a, 5b, towards the intermediate image plane 7 and the mirror 8 located therebehind. From the mirror 8, the light reaches the exit pupils 11a, 11b over a concave mirror 9 and a lens assembly 10, in the same manner as in the three-dimensional image viewing apparatus of FIG. 1 and 2.

The primary partial images 1a, 1b of the pair of stereoscopic images are reduced in the case of the embodiment shown in FIG. 1 and 2 with an image scale of $\beta'_2 = -0.6667$, which means reduced by 1.5 times and as such reproduced in the intermediate image plane 7. This image forming scale has been arbitrarily selected and can be adjusted to various picture screens dimensions. The dimensions of the picture screens chosen in the case of the three-diemnsional image viewing apparatus are the result of a compromise taking into consideration manufacturing limits as well as the compactness of the three-dimensional image viewing apparatus according to the invention. If smaller picture screens can be built, the three-dimensional image viewing apparatus could be even more compact. If larger picture screens have to be used, the three-dimensional image viewing apparatus becomes correspondingly more voluminous.

In order to obtain a high quality of image forming, in the case of each of the three-dimensional image viewing apparatus shown in FIG. 1 and 2 a five-lens unsymmetrical double Gauss objective 5a, respectively 5b is used, which is so corrected as to compensate the effect of the field lenses 2a, 2b on the image field curvature The field lenses 2a, 2b are individual converging lenses with an optimal depth of curvature. An objective assembly consisting of field lens 2a and objective 5a is represented in section in FIG. 6. Its optical data are indicated in Table 1 at the end of the specification. Both image forming objectives 5a, 5b have each a focal distance of $f_2 = 96$ mm with a diaphragm characteristic number $k = 2.4$, e.g. that the entrance pupils of the image forming objectives 5a, 5b, determined essentially by the mounting edges 6a, 6b, have a diameter of $d_2 = 40$ mm.

Because the mounting edges 6a, 6b of the two image forming objectives 5a, 5b are reproduced as exit pupils 11a, 11b with an image forming scale of approximately $\beta'_3 = -1.5$ at the level of the viewers eyes with the aid of the positive optical system on the eye side 9, 10 which follows the intermediate image plane 7 in the ray paths, the distance between the two neighboring image forming objectives 5a, 5b, taking into account their diameters, is selected as small as possible. This way, a distance of about 60 mm between the two exit pupils 11a, 11b has been reached, whereby the diameter of the exit pupils 11a, 11b is also of about 60 mm. This unusual size of the exit pupils 11a, 11b offers the viewer the possibility to change his eye position within the 60 mm diameter in a wide circle and also to vary his distance to the three-dimensional image viewing apparatus quite considerably, without loosing contact with the image.

In the case of the positive optical system on the side of the eye of the three-dimensional image viewing apparatus according to FIG. 1 and 2, the concave mirror 9 has a mirror radius of $r_{sp} = 620$ mm, so that the focal distance is $f_{sp} = 310$ mm. The lens assembly 10 consists of a double-lens achromatic objective with a total focal distance of $f_{ach} = 720$ mm and diaphragm characteristic number of $k = 3.6$. The optical data of the lens assembly 10 are indicated in Table 2. FIG. 7 shows the lens assembly 10 in longitudinal section. The distance between the concave mirror 9 and the lens assembly 10 equals 100 mm. The total focal distance of the combination consisting of the concave mirror 9 and the lens assembly 10 has a value of $f_3 = 240$ mm. The lens assembly 10 can be made of glass—or plastic lenses.

The focal point on the side of the objective of the optical system comprising the concave mirror 9 and the lens assembly 10 lies in the intermediate image plane 7. Due to this, the image forming light beams coming from the lens assembly reach the eyes of the viewer as a focal light beams, making possible a viewing without accommodation.

Figure 5:
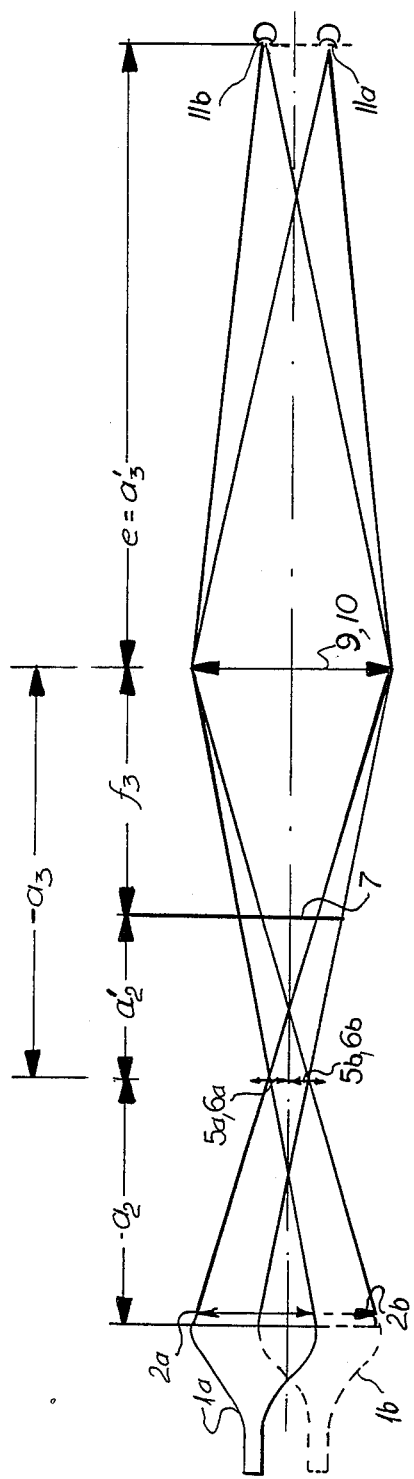

The mode of operation of the three-dimensional image viewing apparatus according to the invention and the mutual interdependence of its data is described more in detail with the aid of the development shown in FIG. 5. In the development, the primary partial images 1a and 1b of the pair of stereoscopic images overlap and thereby make clear the necessity of a folding of the ray paths. The field lenses 2a, 2b are in the immediate vicinity of the primary partial images 1a, 1b and their focal distance $f_1$ is approximately equal with the distance between the partial images 1a, 1b and the image forming objectives 5a, 5b. The positive optical system on the eye side 9, 10 has been replaced in FIG. 5 for reasons of simplification, by a single converging refractive element with a focal distance $f_3$.

Essential for the functioning of the three-dimensional image viewing apparatus is the interlinking of the diaphragm- and image forming ray paths for each eye of the viewer. Certain diemnsion relationships forcibly result therefrom and they are closer described in the following.

The magnitude of the focal distance $f_3$ forcibly results from the determination of the image forming scale in which the mounting edges of the objective 6a 6b are to be reproduced in the exit pupils 11a, 11b. Together with the focal distance $f_3$, the intermediate image plane 7 is also established, so that the requirement of accommodation-free viewing can be met. Furthermore, the image forming scale at which the partial images 1a, 1b are reproduced in the intermediate image plane is established based thereon.

Further points of departure for the determination of the dimensions of the three-dimensional image viewing apparatus according to the invention are the desirably large diameters of the exit pupils 11a, 11b with a size of about 60 mm. Due to the fact that the interpupillary distance of the viewer is also of approximately 60 mm, both exit pupils can be arranged directly next to each other. in order to keep the image forming objectives 5a, 5b at a reduced size, the image forming scale of the positive optical system on the eye side 9, 10 in the ray paths is established at approx. $\beta'_3 = -1.5$. Thus, for the image forming objectives 5a, 5b results a free diameter $d_{2a} = d_{2b} = 40$ mm.

The distance between the positive optical system on the eye side 9, 10 and the eyes of the viewer can be established relatively at will. When the value e is too large, the angle of field of vision becomes unnecessarily small and when the value e is too small the focal distance of the positive optical system on the eye side 9, 10 becomes too short, which leads to problems in the realization of the opening relationships of the positive optical group 9, 10 located on the eye side. Under consideration of both these point of views, a compromise of $e = 600$ mm was reached.

In the case of the distance to the eye established for instance as $e = a'_3 = 600$ mm and together with the priorly established image forming scale $\beta'_3 = -1.5$ a certain value for the focal distance of the positive optical system on the eye side 9, 10 results forcibly over the relation:

$$\beta'_3 = \frac{a'_3}{a_3} \tag{1}$$

$$\text{with } a'_3 = e \tag{2}$$

$$\text{and } a_3 = -a'_2 - f_3 \tag{3}$$

$$\text{to } f_3 = \frac{e}{\beta'_3} - a'_2 \tag{4}$$

When numerical values are introduced the following results:

$$f_3 = \frac{-600}{-1.5} - 160 = 240 \text{ mm}$$

Based on the established image forming scale of $\beta'_3$ results:

$$a_3 = \frac{a'_3}{\beta'_3} \quad (1')$$

and $$a_3 = \frac{600}{-1.5} = -400 \text{ mm}$$

Figure 6:
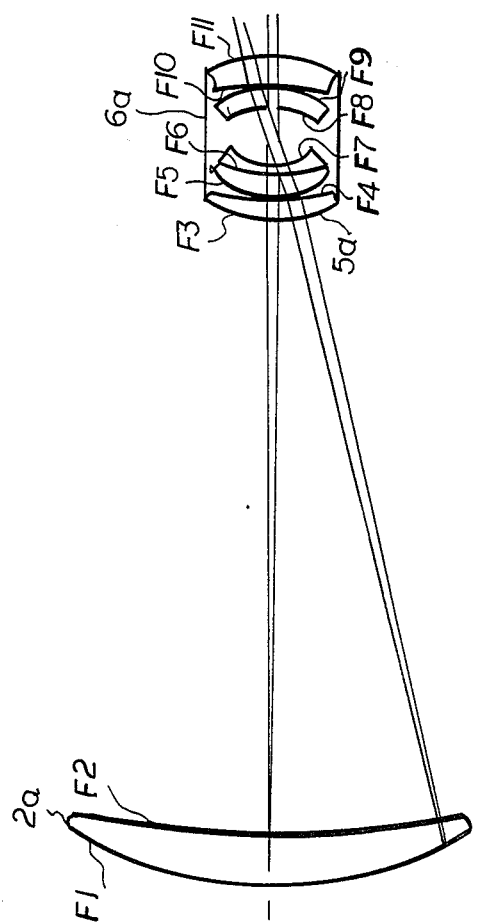

From FIG. 6 results therefore for the image widths $a'_2$ of the image forming objectives 5a and 5b:

$$a'_2 = -a_3 - f_3 = 160 \text{ mm} \quad (5)$$

Corresponding to the size of the primary partial images 1a and 1b the image forming scale of the image forming objectives 5a and 5b:

$$\beta'_2 = \frac{a'_2}{a_2} \quad (6)$$

respectively $$a_2 = \frac{a'_2}{\beta'_2} \quad (7)$$

$$a_2 = \frac{400 \text{ mm}}{\frac{-2}{3}}$$

$$a_2 = -240 \text{ mm}$$

The three-dimensional image viewing apparatus is suitable for many uses. It can be used for computer output equipment for research or entertainment. Further, stereo television and projection of stereo video cassettes become possible with the three-dimensional viewing apparatus according to the invention. Also, real-time video-control surveillance of unaccessible areas or from armored cars can be performed with the apparatus according to the invention.

TABLE I

| Optical data of the objective construction assembly 2a, 5a, respectively 2b, 5b | | | |
|---|---|---|---|
| Surface numeral | Radii (mm) | Thickness (mm) | Glasses $n_e$ | $v_e$ |
| F 1 | 140.00 | | | |
| F 2 | 370.00 | 15.00 | 1.518722 | 63.96 |
| F 3 | 45.28 | 200.00 | clearance | |
| F 4 | 116.45 | 6.10 | 1.694013 | 54.48 |
| F 5 | 23.62 | 0.57 | clearance | |
| F 6 | 45.78 | 7.43 | 1.669995 | 48.13 |
| F 7 | 18.13 | 2.29 | 1.734299 | 28.47 |
| F 8 | −21.66 | 20.58 | clearance | |
| F 9 | −30.88 | 5.34 | 1.791799 | 25.87 |
| F 10 | −178.06 | 0.57 | clearance | |
| F 11 | −41.76 | 9.91 | 1.694013 | 54.48 |

TABLE II

| Optical data of the lens assembly 10 (achromate) | | | |
|---|---|---|---|
| Surface numeral | Radii (mm) | Thickness (mm) | Glasses $n_e$ | $v_e$ |
| F 12 | 433.6 | | | |
| F 13 | −283.0 | 33.0 | 1.51872 | 63.96 |
| F 14 | −283.0 | 0.7 | clearance | |

TABLE II-continued

| Optical data of the lens assembly 10 (achromate) | | | |
|---|---|---|---|
| Surface numeral | Radii (mm) | Thickness (mm) | Glasses $n_e$ | $v_e$ |
| F 15 | −1113.0 | 12.0 | 1.62058 | 36.37 |

I claim:

1. A three-dimensional image viewing apparatus, comprising:

a pair of light-emitting sources generating light-emitting images capable of forming a three-dimensional image for a viewer located at a viewing side distant from said sources;

a respective field lens located directly in front of each source for producing respective optical rays resulting from each of said light-emitting images;

respective sets of first folding mirrors assigned to each of said field lenses for reflecting said optical rays resulting from each of said light-emitting images generally toward said viewing side;

respective objectives receiving optical rays from each of said sets of first folding mirrors for forming overlapping real intermediate images in an image plane located between said sources and said viewing side, each of said objectives having an edge forming a diaphragm and representing an edge of the respective intermediate image corresponding to an edge of an exit pupil for a corresponding final image formed in the eyes of the viewer at said viewing side;

a positive optical system including a curved mirror and a lens system having a focal point located at said image plane and positioned between said sources and said image plane to project said intermediate images to the infinite and form said exit pupils at said exit side, said positive optical system having a focal length and said focal point being so chosen that said exit pupils each have a diameter substantially equal to an interaxial spacing of said exit pupils corresponding substantially to the centric spacing of the eyes of the viewer; and a second folding mirror between said image plane and said positive optical system for reflecting light from said image plane to said positive optical system.

2. The three-dimensional viewing apparatus defined in claim 1 wherein said real intermediate images are not laterally reversed.

3. The three-dimensional viewing apparatus defined in claim 1 wherein said sources are television-receiver tubes.

4. The three-dimensional viewing apparatus defined in claim 1 wherein said sources are computer-controlled graphic picture screens.

5. The three-dimensional viewing apparatus defined in claim 1 wherein said sources are diapositives through which light is projected.

6. The three-dimensional viewing apparatus defined in claim 1 wherein said folding mirrors are plane mirrors.

7. The three-dimensional viewing apparatus defined in claim 1 wherein said objectives are multi-lens objectives of the double-Gauss type, and mounting edges of said objectives form said diaphragms.

8. The three-dimensional viewing apparatus defined in claim 1 wherein said positive optical system has a horizontal diameter on the side thereof turned toward said viewing side which is greater than its vertical diameter.

9. The three-dimensional viewing apparatus defined in claim 1 wherein said positive optical system has said curved mirror as a first element thereof and said curved mirror is a spherically concave mirror.

10. The three-dimensional viewing apparatus defined in claim 1 wherein said positive optical system has said curved mirror as a first element thereof and said curved mirror is an aspherically concave mirror.

11. The three-dimensional viewing apparatus defined in claim 10 wherein the aspherically concave mirror comprises an extra axial partial surface of a paraboloid.

12. The three-dimensional viewing apparatus defined in claim 1 wherein said lens system is a color-corrected lens group.

* * * * *